United States Patent [19]

Takahara et al.

[11] Patent Number: 4,944,718
[45] Date of Patent: Jul. 31, 1990

[54] ANGULAR VELOCITY MODULATING DEVICE

[75] Inventors: Toshiyuki Takahara; Akira Takami, both of Hyogo, Japan

[73] Assignee: Mitsubishi Denki Kabushiki Kaisha, Tokyo, Japan

[21] Appl. No.: 367,072

[22] Filed: Jun. 16, 1989

[30] Foreign Application Priority Data

Jun. 17, 1988 [JP] Japan .............................. 63-80807[U]
Jun. 17, 1988 [JP] Japan .............................. 63-80808[U]

[51] Int. Cl.$^5$ ............................................ F16H 55/17
[52] U.S. Cl. ...................................... 475/16; 475/904; 475/17; 74/437
[58] Field of Search ..................... 74/437, 438; 475/16, 475/17, 904

[56] References Cited

U.S. PATENT DOCUMENTS

| | | | |
|---|---|---|---|
| 1,816,295 | 7/1931 | Pitter | 475/16 |
| 2,239,313 | 4/1941 | Beschkine | 74/125.5 |
| 3,820,411 | 6/1974 | Rudolph | 475/17 |
| 3,886,809 | 6/1975 | Kiss | 475/17 |
| 3,919,895 | 11/1975 | Kerr | 475/17 X |
| 4,012,964 | 3/1977 | Lee | 475/17 X |
| 4,055,091 | 10/1977 | Kerr | 475/17 X |
| 4,765,195 | 8/1988 | Takami | 74/437 X |

FOREIGN PATENT DOCUMENTS 59-42181 10/1984 Japan .

Primary Examiner—Dirk Wright
Attorney, Agent, or Firm—Sughrue, Mion, Zinn, Macpeak & Seas

[57] ABSTRACT

A angular velocity modulating device comprises: a primary angular velocity modulating means including a first non-circular gear which is an internal gear rotatably supported and a second non-circular gear which is an external gear mounted on a second rotary shaft and engaged with the first non-circular gear; a secondary angular velocity modulating means including the first non-circular internal gear and a third non-circular gear which is an external gear mounted on a third rotary shaft and engaged with the first non-circular gear; a first frame rotatably supporting the first non-circular gear and the second rotary shaft; and a second frame rotatably supporting the third rotary shaft, the ratio in angular velocity of the third rotary shaft to the second rotary shaft being the quotient of the secondary angular velocity ratio of the first and second non-circular gears divided by the primary angular velocity ratio of the first and third non-circular gears, whereby the device can be small in size in a radial direction.

2 Claims, 7 Drawing Sheets

ANGULAR VELOCITY MODULATING DEVICE

BACKGROUND OF THE INVENTION

This invention relates to a non-circular gear pair, and to an angular velocity modulating device with the non-circular gear pair or pairs, which may be used to provide a non-step variable transmission applicable to power plants.

In order to provide a mechanical non-step variable transmission, a gear device and an angular velocity modulating device have been disclosed, for instance, Japanese Patent Application (OPI) No's 266866/1986 and 270863/1987. In the conventional device, three or four non-circular external gears forming an intermeshing pitch curve in such a manner as to exponentially change (increase or decrease) the speed ratio are combined as an elementary unit, and a plurality of the elementary units thus provided are used to form the non-step variable transmission.

The above-described conventional angular velocity modulating device is disadvantageous in that it is unavoidably large in a radial direction because all of the non-circular gears forming each elementary unit are external gears.

SUMMARY OF THE INVENTION

Accordingly, an object of this invention is to eliminate the above-described difficulty accompanying a conventional angular velocity modulating device.

More specifically, an object of the invention is to provide a non-circular gear pair to form a non-step variable transmission, and an angular velocity modulating device with the non-circular gear pair, which can be smaller in size in a radial direction than the conventional one.

In a non-circular gear pair according to the invention, with respect to the speed of rotation of one of the non-circular gears kept engaged with each other, a periodic variable rotation speed in an exponential speed increasing or decreasing mode is given to the other non-circular gear, and the non-circular gears are an internal gear and an external gear which have intermeshing pitch curves.

In an angular velocity modulating device according to the invention, first, second and third non-circular gears performing an exponential speed modulating operation are internal, external and external gears, respectively, and the first and second non-circular gear form primary angular velocity modulating means, and the first and third non-circular gears provide secondary angular velocity modulating means.

As was described above, the non-circular gear pair comprises the internal gear and the external gear, and with respect to the speed of rotation of one of the non-circular gears, the periodic variable rotation speed in the exponential speed increasing or decreasing mode is given to the other.

For instance when two of the above-described non-circular gear pairs are used in such a manner that one of the non-circular gear pairs converts a constant speed of rotation into a variable speed of rotation in an exponential speed increasing mode, while the other converts the variable speed of rotation in a speed decreasing mode so that the constant speed of rotation is obtained again. Application of this action can provide a non-step variable transmission. Thus, combination of the internal and external gears can provide a non-step variable transmission which is smaller in a radial direction than the conventional one using only external gears in combination.

The fundamental action of the angular velocity modulating device according to the invention is to give, with respect to the angular velocity of one rotary shaft, a periodic variable angular speed in an exponential speed increasing or decreasing mode. A specific feature of the device resides in that the fundamental action is doubled; that is, it is effected primarily and secondarily. For instance if, when the angular velocity modulation in the exponential speed increasing mode is effected by the primary angular velocity modulating means, the angular velocity modulation in the exponential speed decreasing mode is effected by the secondary angular velocity modulating means, then after the two actions, the angular velocity variation mode is restored to the original one. Accordingly, if the input is in a constant angular velocity mode, then the output is also in a constant angular velocity mode.

The device has a function of switching the angular velocity increasing and decreasing modes. If, in addition to the switching of the angular velocity increasing and decreasing mode, the overlapping of the primary and secondary fundamental actions is changed; that is, the phases of the fundamental actions are shifted, then the absolute value of the ratio in angular velocity between the input and the output can be continuously changed.

Furthermore, in each of the non-circular gear pairs forming the primary and secondary angular velocity modulating means, according to the invention, the first non-circular gear is an internal gear, and the second and third non-circular gear are external gears, whereby the device can be reduced in size in a radial direction.

The nature, principle and utility of the invention will become more apparent from the following detailed description when read in conjunction with the accompanying drawings.

DETAILED DESCRIPTION OF THE INVENTION

Figure 1:
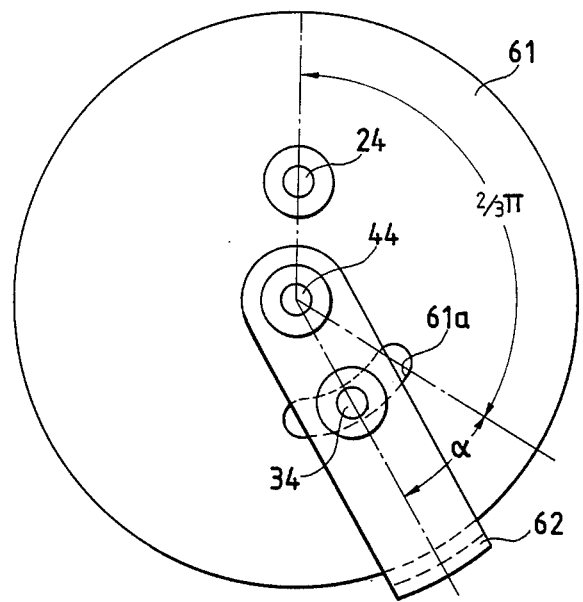
FIG. 1 is a front view showing a first example of an angular velocity modulating device according to this invention.
Figure 2:
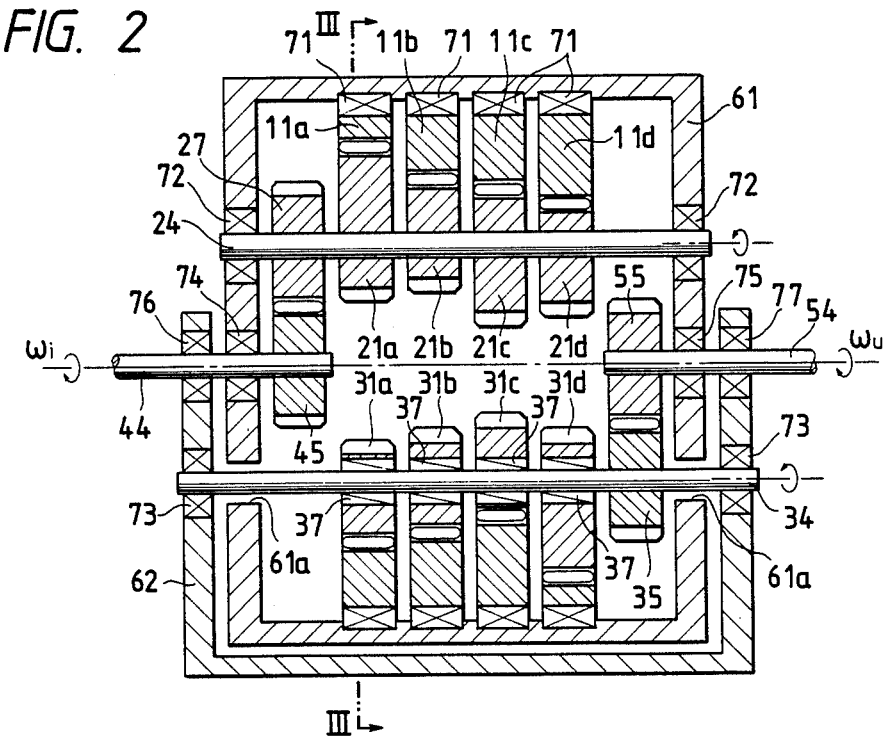
FIG. 2 is a sectional view taken along line II—II in FIG. 3.
Figure 3:
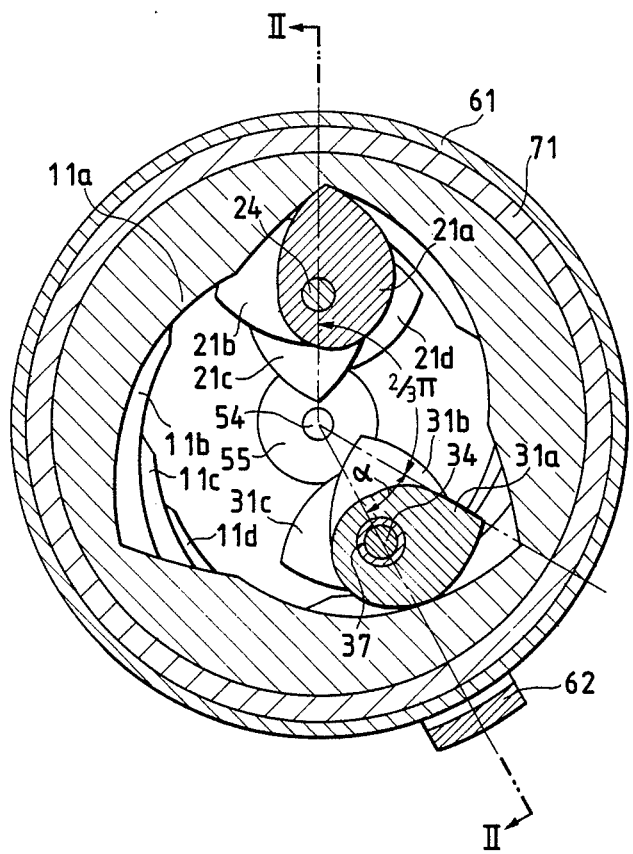
FIG. 3 is a sectional view taken along line III—III in FIG. 2.

A non-step variable gear which is one application of an angular velocity modulating device is as shown in FIGS. 1 through 3 which are a front view, a sectional side view, and a sectional front view thereof, respectively. The non-step variable transmission employs four elementary units; that is, four angular velocity modulating devices each comprising primary and secondary angular velocity modulating means.

As shown in FIGS. 1 through 3, a first one of the four elementary units is so designed that a first non-circular gear 11a, which is an internal gear, is rotatably mounted on a first frame 61 through a bearing 71, and a second non-circular gear 21a and a third non-circular gear 31a, which are external gears, are engaged with the first non-circular gear 11a. The remaining second, third and fourth elementary units are similar in construction to the first elementary unit. The non-circular gears of the second elementary unit are designated by the corresponding references with the suffix letter "b", those of the third elementary unit with the suffix letter "c", and those of the fourth elementary unit with the suffix letter "d".

In FIG. 2, reference numeral 44 designates a fourth rotary shaft which is an input shaft, on which a circular gear 45 is fixedly mounted; 24, a second rotary shaft on which a circular gear 27 engaging with the circular gear 45, and the second non-circular gears 21a, 21b, 21c and 21d are fixedly mounted; 34, a third rotary shaft on which the third non-circular gears 31a, 31b, 31c and 31d are mounted through respective one-way clutches 37, and fixedly mounted a circular gear 55; and 54, a fifth rotary shaft which is an output shaft, on which a circular gear 55 is fixedly mounted. The first frame 61 is stationary. The first frame 61 supports the fourth and fifth rotary shafts 44 and 54 respectively through bearings 74 and 75 in such a manner that rotary shafts 44 and 54 are in alignment with each other, and it further supports the second rotary shaft 24 through bearings 72. The first frame 61 has a pair of arcuate holes 61a into which the third rotary shaft 34 is inserted.

Further in FIGS. 1, 2 and 3, reference character 62 designates a second frame which is a movable frame rotatably supported through bearings 76 and 77 on the rotary shafts 44 and 54. The second frame 62 supports the third rotary shaft 34 and through bearings 73. The second frame 62 can freely change the value $\alpha$ of the central angle $(\frac{3}{8}\pi + \alpha)$ of the third rotary shaft 34 with respect to the second rotary shaft 24 around the common axis of rotation of the first non-circular gears 11a through 11d.

The second non-circular gears 21a, 21b, 21c and 21d are fixedly mounted on the rotary shaft 24 in such a manner that they are arranged at angular intervals of $\pi/2$ radians in a direction of rotation. The clutches 37 have a one-way transfer function of transferring torque from the third non-circular gears 31a, 31b, 31c and 31d to the third rotary shaft 34 only.

As shown in FIG. 2, the second frame 62 can turn, with respect to the first frame 61, about the common axis of rotation of the first non-circular gears 11a through 11d. The angle of rotation is $\alpha$. In the embodiment, the maximum value of $\alpha$ is $0.3\pi$ radian, and the second frame 62 is rotatable in a range of 0 to $0.3\pi$ radian.

In the device thus constructed, the bearing 71, the second and third rotary shafts 24 and 34, the first, second and third non-circular gears 11a, 21a and 31a, and the first and second frames 61 and 62 form a first angular velocity modulating device. Similarly, the above-described bearing, rotary shafts and two frames, and the non-circular gears 11b, 21b and 31b form a second angular velocity modulating device; the bearing, the frames, the rotary shafts and the non-circular gears 11c, 21c and 31c form a third angular velocity modulating device; and the bearing, the rotary shafts, the frames, and the non-circular gears 11d, 21d and 31d form a fourth angular velocity modulating device. That is, the non-step variable transmission shown in FIGS. 1 through 3 is made up of the first through fourth angular velocity modulating devices.

When the non-step variable transmission thus constructed is operated with the fourth rotary shaft as an input shaft and with the fifth rotary shaft as an output shaft, then the ratio of an angular velocity $w_u$ provided at the fifth rotary shaft 54 to an angular velocity $w_i$ given to the fourth rotary shaft is continuously changed with the angle $\alpha$ which can be continuously controlled. This will be described in more detail.

Figure 4:
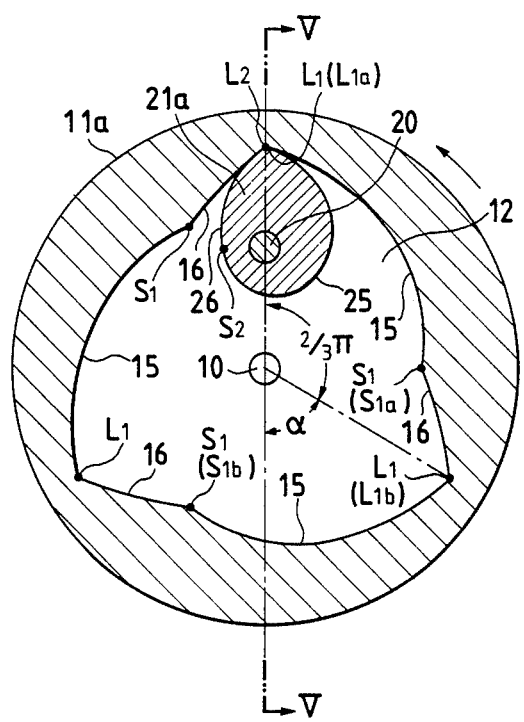
FIG. 4 is a sectional front view for a description of the operating principle of a non-circular gear pair comprising first and second non-circular gears shown in FIG. 3.
Figure 5:
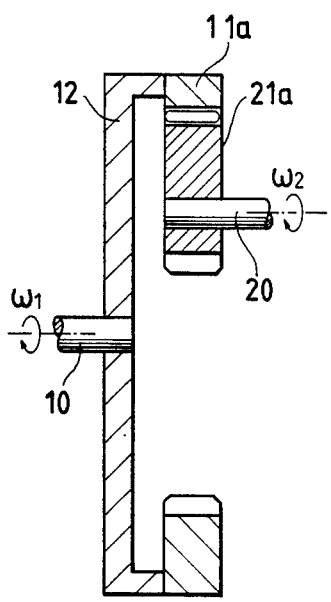
FIG. 5 is a sectional view taken along line V—V in FIG. 4.

FIGS. 4 and 5 show the first non-circular gear 11a and the second non-circular gear 21a, for a description of the operating principle of the non-circular gear pair (the principle may be equally applied to the other non-circular gear pairs 11b and 21b, 11c and 21c, and 11d and 21d). As shown in FIG. 5, the first non-circular gear 11a is fixedly mounted through a bracket 12 on a first rotary shaft 10, and the second non-circular gear 21a whose external gear is engaged with the internal gear of the first non-circular gear 11a is fixedly mounted on the second rotary shaft 20. In FIG. 4, reference numeral 15 designates the speed changing mode intermeshing pitch curves of the first non-circular gear 11a; 16, the restoring mode intermeshing pitch curves of the same 11a; and 25 and 26, the speed changing mode intermeshing pitch curve and the restoring mode intermeshing pitch curve of the second non-circular gear 21a, respectively.

In practice, for instance involute teeth are formed along the above-described intermeshing pitch curves. However, description of the speed of rotation and the transfer torque can be made sufficiently by using the intermeshing pitch lines as they are. Therefore, all or part of the gear teeth is not shown in FIGS. 3 and 4 and others.

The intermeshing pitch curves 15 and 16 are extended between the points $L_1$ and $S_1$, and between the points $S_1$ and $L_1$, respectively. The intermeshing pitch curves 25 and 26 are extended between the points $L_2$ and $S_2$, and between the points $S_2$ and $L_2$, respectively. The intermeshing pitch curves 15 and 25 are equal in length to each other, and the intermeshing pitch curves 25 and 26 are also equal in length to each other. Thus, the total number of gear teeth of the first non-circular gear 11a is three times the total number of gear teeth of the second non-circular gear 21a, and accordingly the second non-circular gear 21a makes three revolutions as the first non-circular gear 11a makes one revolution.

Figure 6:
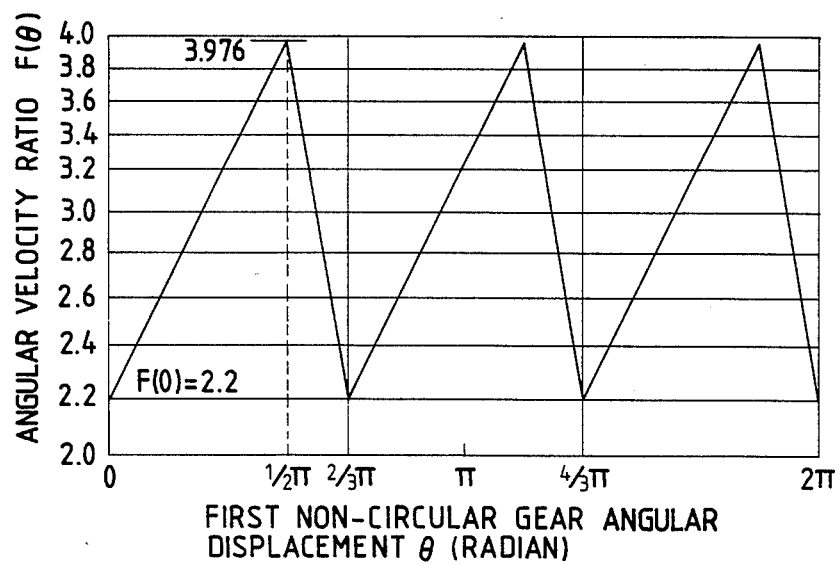
FIG. 6 is a graphical representation indicating the change in angular velocity ratio of the first and second non-circular gears shown in FIG. 4.

FIG. 6 is a graphical representation indicating the angular velocity of the first non-circular gear with that of the second circular gear, with the horizontal axis indicating the angular displacement $\theta$ of the first non-circular gear 11a turning counterclockwise in FIG. 4. The angular displacement $\theta$ is measured under the condition that, when the gears 11a and 21a are positioned as shown in FIG. 4; i.e., the intermeshing points are $L_{1a}$ and $L_2$, the angular displacement is zero (0). The vertical axis represents the ratio $F(\theta)$ of the angular velocity of the first non-circular gear 11a to that of the second non-circular gear 21a in logarithmic scale. The angular velocity ratio $F(\theta)$ of the first and second non-circular gears 11a and 21a, which is a function of $\theta$, is:

$$F(\theta) = |w_2/w_1|$$

where $w_1$ is the angular velocity of the first non-circular gear 11a, and $w_2$ is the angular velocity of the second non-circular gear 21.

As the first non-circular gear 11a positioned as shown in FIG. 4 is turned through $\pi/2$ radian, the intermeshing points of the two gears 11a and 21a are shifted from $L_{1a}$ and $L_2$ to $S_{1a}$ and $S_2$. This operation is indicated by the straight line extending from the reference angular velocity ratio $F(0)$ obliquely up to the right in FIG. 6. Hereinafter, this intermeshing will be referred to as "speed changing mode meshing", when applicable. In succession, the first non-circular gear 11 is turned through $\pi/6$ radian; that is, the gear 11a positioned as shown in FIG. 4 is turned through $\frac{2}{3}\pi$ radian, so that the intermeshing points of the two gears are shifted from $S_{1a}$ and $S_2$ to $L_{1b}$ and $L_2$. This operation is indicated by the straight line extended obliquely down to the right in FIG. 6. Hereinafter, this intermeshing will be referred to as "returning mode intermeshing", when applicable.

As is apparent from FIG. 6, the specific feature of the angular velocity modulating device resides in that the logarithmic values of angular velocity ratios ($\theta$) are increased or decreased in primary proportion to angular displacements $\theta$. That is, the angular velocity ratio $F(\theta)$ is defined by an exponential function $e^{K\theta} F(\theta)$, where e is the base of natural logarithm, and K is the angular velocity modulating coefficient. In this case, K has two kinds of values; i.e., positive and negative values $K+$ and $K-$. In FIG. 6, K is defined as a differential value: $K = d \log F(\theta)/d\theta$. For instance, in the case of FIG. 4, $K+ = +0.3764$ radians$^{-1}$, and $K- = -1.129$ radian$^{-1}$.

Having the above-described angular velocity relationship, the pair of gears, namely, the first and second non-circular gears 11a and 21a can be used to form a non-step variable transmission.

Figure 7:
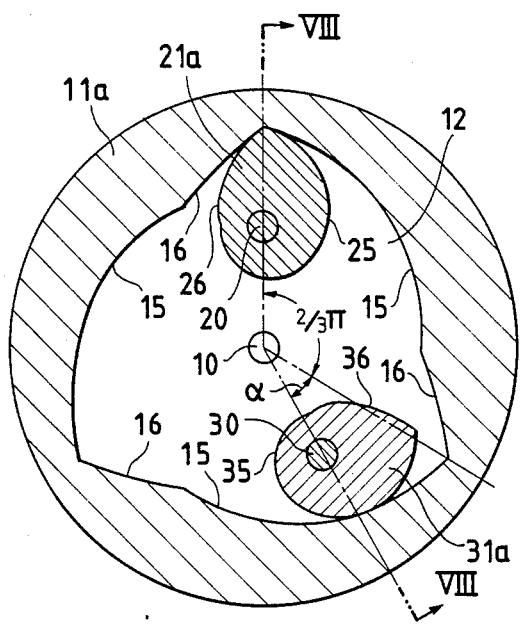
FIG. 7 is a sectional front view for a description of the operating principle of the angular velocity modulating device comprising the first, second and third non-circular gears shown in FIG. 3.
Figure 8:
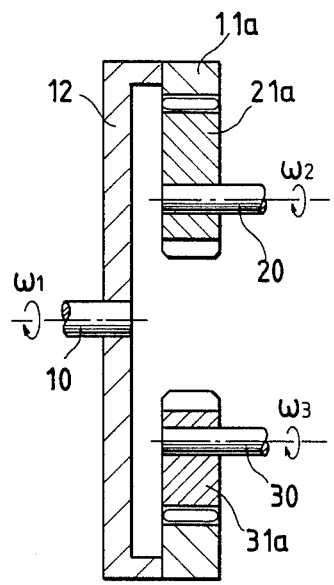
FIG. 8 is a sectional view taken line VIII—VIII in FIG. 7.

A angular velocity modulating operation resulting from the above-described angular velocity ratio of the non-circular gears will be described with reference to FIGS. 7 and 8 which are a sectional front view and a sectional side view showing part of the angular velocity modulating device shown in FIG. 3, for a description of the operating principle thereof. FIGS. 7 and 8 show the third non-circular gear 31a in addition to the first and second non-circular gear 11a and 21a which have been described with reference to FIGS. 4 through 6.

The specification of the third non-circular gear 31a is equal to that of the second non-circular gear 21a. Hereinafter, the combination of the first and second non-circular gears 11a and 21a will be referred to as "primary angular velocity modulating means", and the combination of the first and third non-circular gears 11a and 31a "secondary angular velocity modulating means", when applicable. The first angular velocity modulating means is to determine the ratio of the angular velocity $w_2$ of the second rotary shaft 20 to that $w_1$ of the first rotary shaft 10. This ratio will be referred to as "a primary angular velocity ratio", when applicable. Similarly, the second angular velocity modulating means is to determine the ratio of the angular velocity $w_3$ of the third rotary shaft 30 to that $w_1$ of the first rotary shaft 10, and the ratio will be referred to as "a secondary angular velocity ratio", when applicable. The primary angular velocity modulating means is as described with reference to FIGS. 4 through 6. The same description is applicable to the secondary angular velocity modulating means. However, it should be noted that, as shown in FIG. 7, the third rotary shaft 30 is so positioned that it forms a central angle of $(\frac{2}{3}\pi + \alpha)$ with the second rotary shaft 20 around the axis of rotation of the first non-circular gear 11a. When the third non-circular gear 31a turns along the inner periphery of the first non-circular gear 11a, the same positional relationship between the first and third non-circular gears is established every central angle of $\frac{2}{3}\pi$ radian. Therefore, the provision of the central angle of $\frac{2}{3}\pi + \alpha$ is equivalent to the determination of a central angle of $\alpha$. Accordingly, when the primary angular velocity modulating means is in an intermeshing state with an angular displacement ($\theta$) of the first non-circular gear 11a, the secondary angular velocity modulating means is in an intermeshing state with an angular displacement ($\theta + \alpha$) of the first non-circular gear 11a. Hence, when the primary angular velocity $|w_2/w_1|$ is represented by the above-described exponential function $e^{K\theta} F(0)$, the secondary angular velocity ratio is represented by an exponential function $e^{K(\theta+\alpha)} F(0)$. Under this condition, the ratio ($w_3/w_2$) of the angular velocity of the third rotary shaft to that of the second rotary shaft is the quotient of the secondary angular velocity ratio divided by the primary angular velocity ratio; that is, an exponential function $e^{K \cdot \alpha}$ using the above described angle $\alpha$. This expression $e^{K \cdot \alpha}$ indicates a fundamental characteristic of the operation of the angular velocity modulating device according to the invention.

Figure 9:
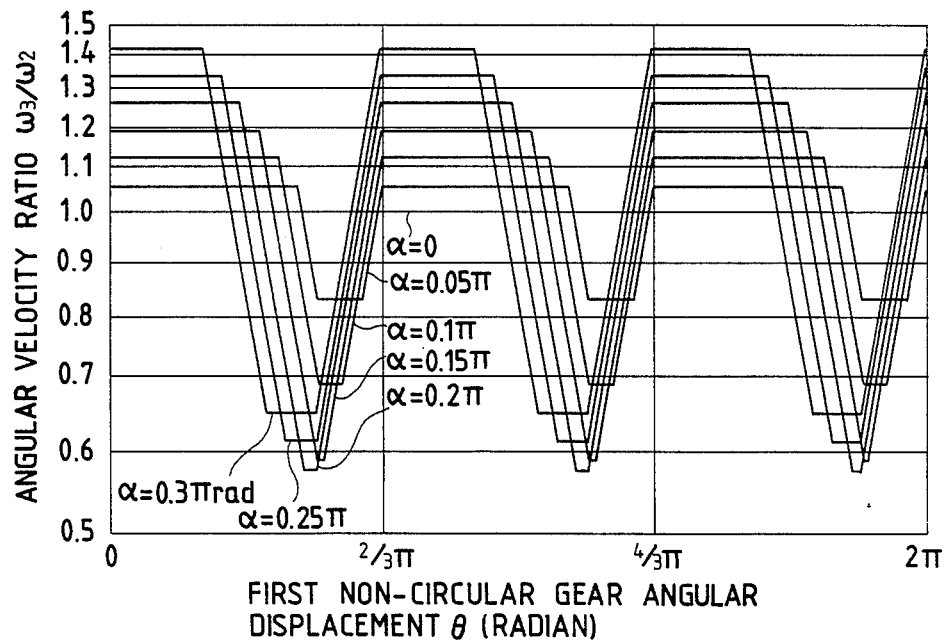
FIG. 9 is a graphical representation indicating an operating characteristic of the angular velocity modulating device shown in FIG. 7.

FIG. 9 is a graphical representation indicating angular velocity ratio $w_3/w_2$ with control angle $\alpha$. As is apparent from FIG. 9, depending on the combination of non-circular pairs, the ratio $w_3/w_2$ has a constant value over a certain radian, and changes in correlation with the value $\alpha$.

A non-step variable transmission can be formed by using the angular velocity modulating devices as elementary units as follows: The elementary units are combined with first means for varying the value $\alpha$, second means for continuously holding the angular velocity ratio $w_3/w_2$ constant, and third means for detecting only a particular value out of the repetitive variation pattern of angular velocity ratio. These means will be described in more detail.

The first means for varying the value α can be obtained by providing a mechanism which allows the second frame 62 to rotate with respect to the first frame 61, as was described with reference to FIGS. 1 through 3. The first means can be used commonly for all the elementary units.

The second means for continuously holding the angular velocity ratio $w_3/w_2$ constant can be obtained by fixedly mounting the second non-circular gears 21a, 21b, 21c and 21d on the second rotary shaft 24 in such a manner that they are arranged at angular intervals of $\pi/2$ radian. The fact that the second non-circular gears are arranged at angular intervals of $\pi/2$ radian means the establishment of the following equation:

$$G_{2(\theta)} = G_{1(\theta-\beta)}$$

where $G_{1(\theta)}$ is the angular velocity ratio $w_3/w_2$ of the first angular velocity modulating device in which the second and third non-circular gears 21a and 31a are engaged with the first non-circular gear 11a, and $G_{2(\theta)}$ is the angular velocity ratio $w_3/w_2$ of the second angular velocity modulating device formed in which the second and third non-circular gears 21b and 31b are engaged with the first non-circular gear 11b. Similarly, $G_{2(\theta)}$ and $G_{3(\theta)}$, $G_{3(\theta)}$ and $G_{4(\theta)}$, and $G_{4(\theta)}$ and $G_{1(\theta)}$ can be defined. In the above described expression, β is such that the phase difference $\pi/2$ given to the second non-circular gears 21a through 21d on the second rotary shaft 24 is replaced with the phase difference of the first non-circular gears 11a, 11b, 11c and 11d on the axis of the fourth rotary shaft 44, thus having a value which is a function of the angular displacement θ of the first rotary shaft 10. In the embodiment shown in FIGS. 1 through 3, the minimum value of β is $0.375\pi$ radian.

Figure 10:
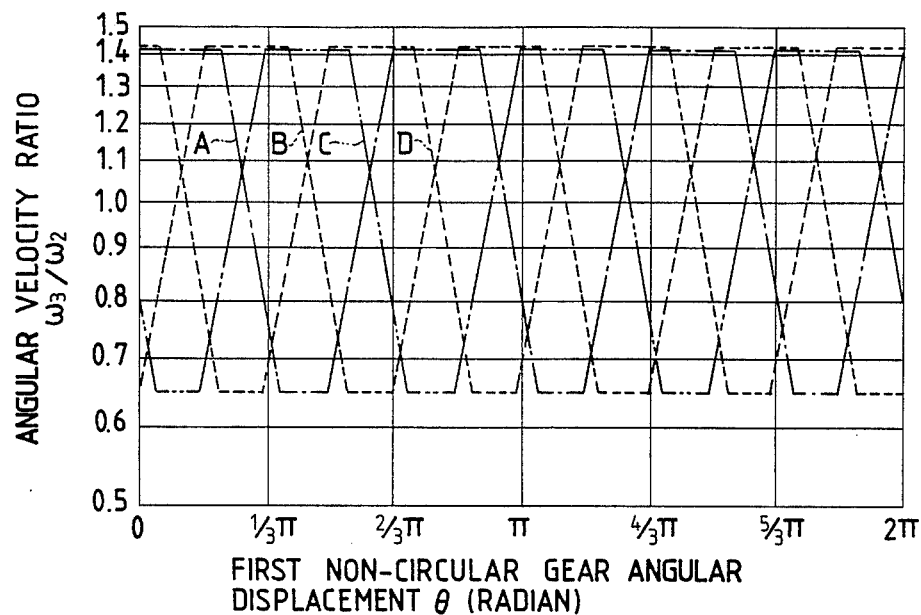
FIG. 10 is a graphical representation for a description of one non-step seed changing action of the device shown in FIG. 2.

FIG. 10 is a graphical representation indicating the angular velocity ratios $w_3/w_2$ of the first through fourth angular velocity modulating device with polygonal lines A through D. In the range satisfying $\alpha \leq \beta_{min}$, the angular velocity ratio $w_3/w_2$ is held at the constant value $e^{K \cdot \alpha}$ over the entire range of angular displacement θ. The graphical representation indicates the case where $\alpha = 0.3\pi$ under that condition.

The third means for selecting only a particular value out of the different angular velocity ratios of the angular velocity modulating means can be provided by using a one way clutch function. In FIGS. 2 and 3, the angular velocity ratios of the third non-circular angular gears 31a through 31d with respect to $w_2$ correspond to the polygonal lines A through D in FIG. 10, respectively. Means for applying to the third rotary shaft 34 only the angular velocity attributing to one of the angular velocity ratios A through D are the one-way clutch function bearings 37. Those bearings 37 are so designed as to transmit torque from the third non-circular gears 31a through 31d only to the third rotary shaft 34 so that the latter 34 is rotated in the direction of the arrow shown in FIG. 2. That is, the highest of the angular velocity ratios indicated by the polygonal lines A through D in FIG. 10 is used for rotation of the rotary shaft 34, and the others not used, idling it.

Figure 11:
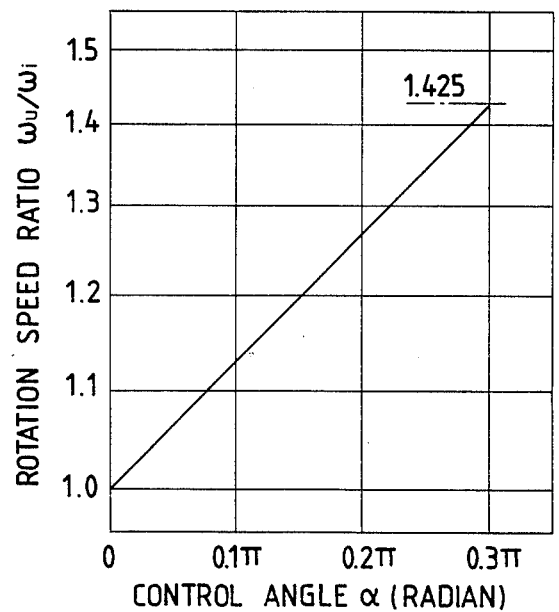
FIG. 11 is a graphical representation indicating input and output shaft rotation speed ratios with respect to control rotation angles in the device shown in FIG. 2.

As is apparent from the above description, and angle α can be steplessly controlled. Therefore the angular velocity ratio $w_3/w_2$, too, can be steplessly controlled, and when the angle α is fixed, it is set to a constant value correlating to the angle α. In the embodiment shown in FIG. 2, the fourth and fifth rotary shafts 44 and 54 are coupled through a pair of ordinary circular gears 45 and 25 and a pair of ordinary circular gears 55 and 35 to the second and third rotary shafts 24 and 34, respectively. In this case, the input and output shafts of the non step variable speed device are arranged coaxial. The gear ratio of the pair of circular gears 45 and 25 and that of the pair of circular gears 55 and 35 can be set to desired values, respectively. These gear ratios are important in order to set the rotation speed ratio of the input and output shafts of the non-step variable transmission; however, it is not directly related to the angular velocity modulation which is a technical concept of the invention. FIG. 11 is a graphical representation indicating an input and output shaft angular speed ratio of the example (FIGS. 1 though 3) of the non-step variable transmission in which the gear ratios of the pairs of circular gears 45 and 25, and 55 and 35 are set to one (1), and the fourth shaft 44 and the fifth rotary shaft 55 are employed as the input shaft and the output shaft, respectively. In other words, input and output shaft rotation speed ratios $w_u/w_i$ with angles α determined by turning the second frame 62 are indicated by the oblique straight line on a one-sided logarithmic graph.

The angular velocity modulating device has been described with reference to the non-circular gears shown in FIGS. 3, 4 and 7; however, it should be noted that the invention is not limited thereto or thereby. A second example of the angular velocity modulating device using other non-circular gears will be described with reference to FIG. 12.

Figure 12:
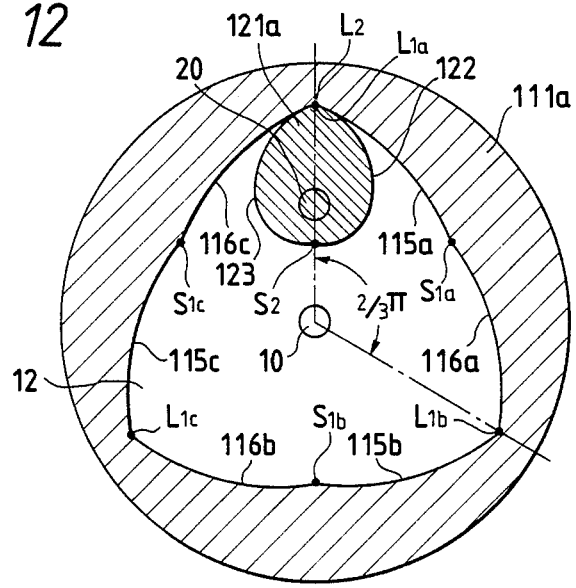
FIG. 12 is a sectional front view showing a non-circular gear pair in a second example of the angular velocity modulating device according to the invention.
Figure 13:
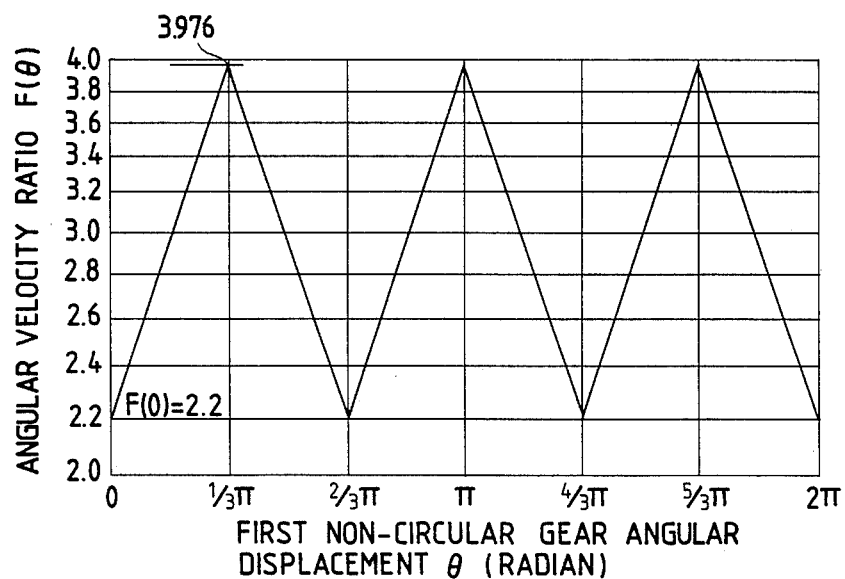
FIG. 13 is a graphical representation indicating angular velocity ratios in the non-circular gear pair shown in FIG. 12.

FIG. 12 shows non-circular gears in the second example of the angular velocity modulating device which are different from those shown in FIG. 4. In FIG. 12, reference characters 111a designates a first non-circular gear which is an internal gear, and has intermeshing pitch curves 115a, 116a, 115b, 116b, 115c and 115d; 121a, a second non-circular gear which is an external gear and has intermeshing pitch curves 122 and 123. FIG. 13 is a graphical representation indicating the relationship in angular velocity between the first non-circular gear 111a and the second non-circular gear 121a. In FIG. 13, the horizontal and vertical axes and the data θ, $w_1$, $w_2$, $F(\theta)$ and $F(0)$ are determined in the same manner as in FIG. 6. When the first non-circular gear 111a positioned as shown in FIG. 12 turns through an angle of $\frac{1}{3} \cdot \pi$ radian, the intermeshing points of the first and second non-circular gears 111a and 121a are shifted from $L_{1a}$ and $L_2$ to $S_{1a}$ and $S_2$. The change in angular velocity ratio $F(\theta)$ during this period is represented by the straight line extended obliquely up to the right in FIG. 13. In this operation, $F(\theta) = e^{k1 \cdot \theta} F(0)$ is held. When the first non-circular gear 111a further turns through $\frac{1}{3} \cdot \pi$ radian, the intermeshing points are shifted to $L_{1b}$ and $L_2$. This operation is indicated by the straight line extended obliquely down to the right in FIG. 13. In this case, $F(\theta) = e^{K2(\theta - \pi/3)} F(\pi/3)$. Thus, the first non-circular gear has made $\frac{1}{3}$ revolution, while the second non-circular gear one revolution. While the first non-circular gear 111a makes the remaining $\frac{2}{3}$ revolution, the second non-circular gear 121a makes two revolutions. In this operation, the change in angular velocity is the same as in the first revolution described above. In the angular velocity modulating device shown in FIG. 12, the angular velocity modulating coefficients are $K_1 = 0.3764$ radian$^{-1}$, and $K_2 = -0.3764$ radian$^{-1}$.

Figure 14:
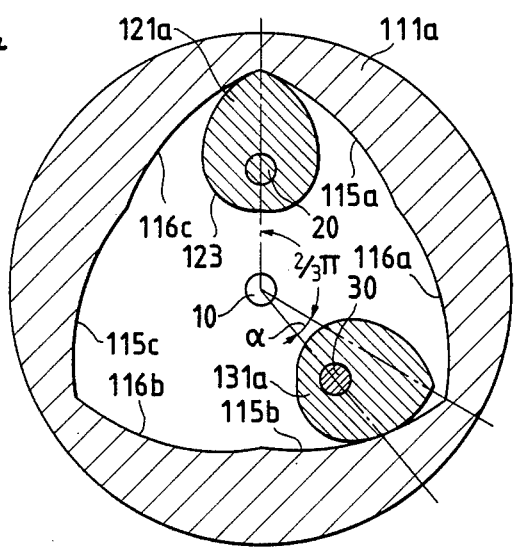
FIG. 14 is a sectional front view showing essential components of the angular velocity modulating device; i.e., a third non-circular gear in addition to the first and second non-circular gears shown in FIG. 12.
Figure 15:
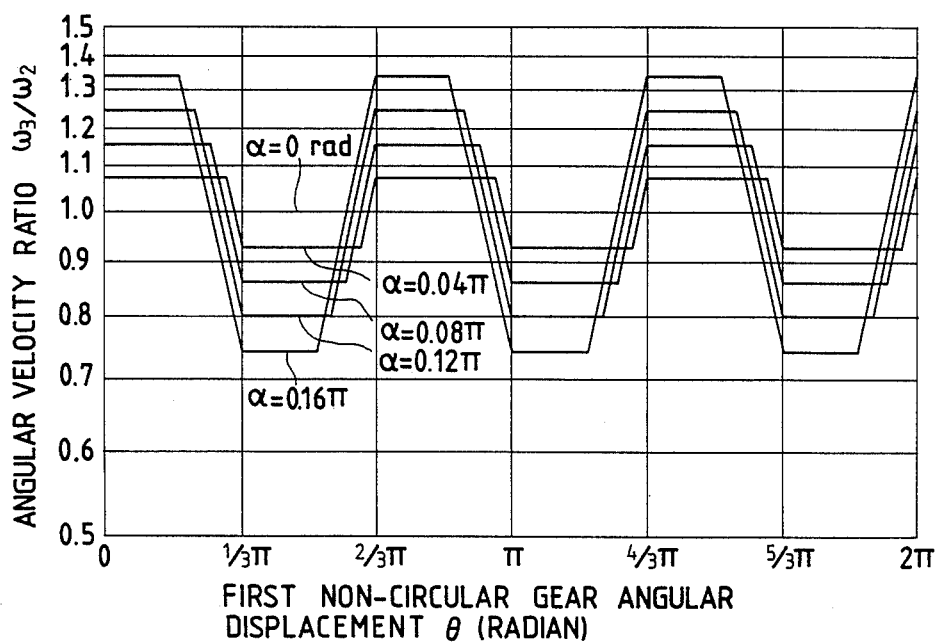
FIG. 15 is a graphical representation indicating an operating characteristic of the device shown in FIG. 14.

FIG. 14 shows a part of the arrangement of the second example of the angular velocity modulating device according to the invention which employs the pair of non-circular gears as described with reference to FIGS. 12 and 13. More specifically, FIG. 14 shows a third non-circular gear 131a in addition to the first and second non-circular gears 111a and 121a. The specification of the third non-circular gear is equal to that of the second non-circular gear 121a. Operating characteristic curves of the angular velocity modulating device are as shown in FIG. 15, in which the horizontal and vertical axes, and the data $\theta$, $\alpha$ and $w_3/w_2$ are determined in the same manner as in FIG. 9.

Using as elementary unit, the second example of the angular velocity modulating device shown in FIGS. 12 through 15, similarly as in the first example described with reference to FIGS. 4 through 9, a non-step variable transmission is provided. The non-step variable speed characteristic is the same as that in the first example shown in FIG. 11; that is, the control angle $\alpha$ is in primary proportion to the logarithmic value of input and output rotation speed ratio $w_u/w_i$.

In the above-described embodiments, the first frame 61 is stationary, whereas the second frame 62 is rotatable. However, they may be so modified that the second frame 62 is stationary, while the first frame 61 is movable.

As was described above, according to the invention, one of the pair of non-circular gears whose intermeshing pitching curves are so designed as to provide the periodic variable rotation speed in an exponential speed increase or decrease mode is an internal gear, and the other is an external gear, and the angular velocity modulating means, or the elementary units, for application of a non-step variable transmission, are made up of the above-described pairs of non-circular gears suitably engaged with one another. Therefore, a non-step variable transmission high in transmission efficiency can be provided smaller in size in a radial direction than the conventional one.

What is claimed is:

1. An angular velocity modulating device which comprises:
   first and second rotary shafts;
   first and second bearing means;
   primary angular velocity modulating means including
   a first non-circular gear which is an internal gear rotatably supported, and
   a second non-circular gear which is an external gear fixedly mounted on said first rotary shaft and engaged with said first non-circular gear,
   with a primary angular velocity ratio for said first and second non-circular gears;
   secondary angular velocity modulating means including
   said first non-circular gear, and
   a third non-circular gear which is an external gear mounted on said second rotary shaft in such as manner as to be able to transmit power and engaged with said first non-circular gear,
   with a secondary angular velocity ratio for said first and third non-circular gears;
   a first frame supporting said first non-circular gear and said first rotary shaft through said first bearings; and
   a second frame supporting said second rotary shaft through second bearings, said second frame being rotatably supported about the axis of rotation of said first non-circular gear, relative to said first frame, one of said first and second frames being stationary,
   wherein said primary angular velocity ratio expressed by an exponential function $e^{K\theta} \cdot F(0)$ where $F(0)$ and $K$ are the reference angular velocity ratio and the angular velocity modulating coefficient which are set to desired values in advance, and $\theta$ is the angular displacement of said first non-circular gear, and
   said secondary angular velocity ratio expressed by an exponential function $e^{K(\theta+\alpha)}F(0)$ where $F(0)$ is said reference angular velocity ratio, and $\alpha$ is the angle which is set to a desired value by adjusting the relative rotation of the said first and second frames, and
   a condition is provided in which the ratio in angular velocity of said third rotary shaft to said second rotary shaft is given by an exponential function $e^{K\alpha}$, where $K$ is said angular velocity modulating coefficient and $\alpha$ is said angle, which is the quotient of said secondary angular velocity ratio divided by said primary angular velocity ratio.

2. A non-circular gear pair comprising:
   a first non-circular gear which is an internal gear rotatably supported; and
   a second non-circular gear which is an external gear mounted on a rotary shaft the axis of which is in parallel with the axis of rotation of said first non-circular gear, said second non-circular gear being kept engaged with said first non-circular gear for power transmission,
   said first and second non-circular gears having intermeshing rotary portions along the intermeshing pitch curves thereof which, when the absolute value $w_2/w_1$ of the ratio of the angular velocity $w_2$ of said second non-circular gear to the angular velocity $w_1$ of said first non-circular gear is represented by a function $F(\theta)$ of the angular displacement $\theta$ of said first non-circular gear, allows a differential value $K$ defined by a differential equation $K = d \log F(\theta)/d\theta$ to be continuously a positive or negative constant or approximately constant value.

* * * * *